United States Patent [19]

Watson et al.

[11] Patent Number: 4,555,493

[45] Date of Patent: Nov. 26, 1985

[54] ALUMINOSILICATE CERAMIC PROPPANT FOR GAS AND OIL WELL FRACTURING AND METHOD OF FORMING SAME

[75] Inventors: David R. Watson, Benton; Val G. Carithers, Little Rock; L. Thomas McDaniel, Benton, all of Ark.

[73] Assignee: Reynolds Metals Company, Richmond, Va.

[21] Appl. No.: 559,048

[22] Filed: Dec. 7, 1983

[51] Int. Cl.$^4$ .................. B02C 23/00; C04B 35/16; C04B 35/10

[52] U.S. Cl. ........................... 501/127; 166/280; 209/214; 241/25; 264/117; 501/128; 501/145

[58] Field of Search ............... 501/127, 128, 145; 166/280; 264/117; 209/214; 241/25

[56] References Cited

U.S. PATENT DOCUMENTS

| | | | |
|---|---|---|---|
| 3,497,008 | 2/1970 | Graham et al. | 166/280 |
| 3,730,445 | 5/1973 | Lee et al. | 241/25 |
| 3,758,318 | 9/1973 | Farris | 501/128 |
| 3,888,311 | 6/1975 | Cooke | 166/280 |
| 3,976,138 | 8/1976 | Colpoys | 166/280 |
| 3,998,271 | 12/1976 | Cooke et al. | 166/308 |
| 4,029,148 | 6/1977 | Emery | 166/254 |
| 4,068,718 | 1/1978 | Cooke et al. | 166/280 |
| 4,251,265 | 2/1981 | Stratton et al. | 75/3 |
| 4,303,204 | 12/1981 | Weston | 209/214 |
| 4,427,068 | 1/1984 | Fitzgibbon | 166/280 |
| 4,440,866 | 4/1984 | Lunghofer et al. | 501/127 |

FOREIGN PATENT DOCUMENTS

| | | | |
|---|---|---|---|
| 521930 | 4/1982 | Australia | 166/280 |
| 2037727A | 7/1980 | United Kingdom | 264/117 |

OTHER PUBLICATIONS

Taggart, A. F., Handbook of Mineral Dressing, Wiley & Sons, NYC, (1944) Section 3, pp. 3-13 thru 3-18 on CLAY, and Section 6, pp. 6-50 thru 6-51, (Dry-Grinding Circuits).

Eirich Bulletin: Granulation Machines and Plant, pp. 1-10, Oct. 1971.

"Lightweight Proppants for Deep Gas Well Stimulation", pub. Oct. 1981, DOE/BC/10038-19.

Decision In re Jimmie L. Huitt et al., 853 O.G., Aug. 6, 1968.

*Primary Examiner*—Helen M. McCarthy
*Attorney, Agent, or Firm*—Alan M. Biddison

[57] ABSTRACT

An aluminosilicate ceramic product or article and a method of forming the article from as-mined ore. The product is useful as a proppant in gas and oil well fracturing. The ratio, on a calcined basis, of alumina to silica is between approximately 2.2 to 4.0. The amount of iron in the product is controlled as a function of the alumina to silica ratio so as to produce products having less than ten percent (10%) crush loss when subjected to a force of 10,000 psi.

2 Claims, 8 Drawing Figures

ALUMINOSILICATE CERAMIC PROPPANT FOR GAS AND OIL WELL FRACTURING AND METHOD OF FORMING SAME

BACKGROUND OF THE INVENTION

1. Field of the Invention

The present invention provides an aluminosilicate ceramic product, such as a proppant for gas and oil well fracturing and a method of forming the product. The proppant is used in a conventional manner to maintain a fracture in a subterrainian formation in a propped condition.

2. Description of the Prior Art

Hydraulic fracturing is a well stimulation technique designed to increase the productivity of a well by creating highly conductive fractures or channels in the producing formation surrounding the well. The process normally involves injecting a fluid at a sufficient rate and pressure to rupture the formation thereby creating a crack or fracture in the rock, and thereafter placing a particulate material or propping agent in the formation to maintain the fracture walls open by resisting forces tending to close the fracture. The propping agent or proppant must have sufficient mechanical strength to bear the closure stresses, provide relatively high permeability in the propped fracture, and resist chemical attack by liquids or gasses in the formation.

The literature describes numerous materials that apparently would be suitable for use as proppants. For instance, U.S. Pat. No. 3,497,008, entitled "Method of Propping Fractures with Ceramic Particles", describes proppant particles having a preferred composition of hard glass. Typical glass compositions identified in the patent include soda-lime-silica, aluminosilicate, borosilicate, soda-zinc-silica, soda-barium-silica, high silica, and aluminoborosilicate. The patent also identifies other ceramic materials and porcelains usable as proppants, such sintered alumina, steatite, and mullite.

Additional examples of proppants are described in U.S. Pat. No. 3,976,138, entitled "Method of Increasing Permeability in Subsurface Earth Formation". Table 1 of this reference illustrates four samples of alumina pellets that are supposedly suitable for use as proppants.

Other materials are described in U.S. Pat. No. 3,998,271, entitled "Multiple Fracturing of Subterrainian Formations"; U.S. Pat. No. 4,029,148, entitled "Well Fracturing Method"; and U.S. Pat. No. 4,068,718, entitled "Hydraulic Fracturing Method Using Sintered Bauxite Propping Agent".

Also known are various techniques for forming pellets from bauxitic clays. For instance, U.K. Patent Application No. 2,037,727, entitled "Sintered Spherical Ceramic Pellets for Gas and Oil Well Proppants", describes a process for manufacturing spherical sintered ceramic pellets of bauxite. U.S. Pat. No. 3,888,311, entitled "Hydraulic Fracturing Method", describes a method of preparing cement pellets. U.S. Pat. No. 4,251,265, entitled "Clay Preparation", describes a process for pelletizing as-mined clay that includes the steps of crushing the clay to within an appropriate size range, blending the crushed clay with water to achieve a desired moisture content, pelletizing the clay in a suitable apparatus to provide clay pellets of predetermined size, surface hardening the pellets, and drying and calcining the pellets at an elevated temperature.

SUMMARY OF THE INVENTION

The present invention provides an improved aluminosilicate ceramic pellet and a method of forming such a pellet. The pellet provided by the present invention is especially useful as a proppant for use in fracturing of oil, gas, and similar wells. However, the pellet also has other uses such as an abrasive and as hard facing on plastic pipes. For the purposes of simplicity, the pellet hereinafter will be referred to as a proppant or a propping agent.

With the method provided by the present invention, an as-mined aluminosilicate clay is processed to provide substantially spherical pellets. A suitable clay contains about fifty percent (50%) kaolinite clay ($Al_2O_3.2SiO_2.2H_2O$) and forty percent (40%) of bauxite in the form of Gibbsite ($Al_2O_3.3H_2O$). During sintering, the kaolinite reacts with alumina from the Gibbsite to form a high strength compound similar to mullite ($3Al_2O_3.2SiO_2$).

As part of the processing operation provided by the present invention, the weight ratio of alumina ($Al_2O_3$) to silica ($SiO_2$) is determined for the clay. Preferably, such ratio is in the range of approximately 2.2 to 4.0. Also, the percentage, by weight, of $Fe_2O_3$ is determined for the particles. Depending on the weight ratio of alumina to silica and the weight percentage of $Fe_2O_3$, iron-containing particles, such as siderite ($FeCO_3$) and ilmenite ($FeO.TiO_2$), may be removed during processing so as to control the strength of the proppants formed from the particles.

The processing operation includes conventional steps, such as crushing and grinding to obtain particles of a desired size. If necessary, iron-containing particles are removed and the remaining particles are fed to a pellet forming device. Pellets, which are substantially spherical, are formed and fed to a furnace for sintering and calcination. The resulting pellets exhibit less than a 10% crush loss when subjected to a pressure of 10,000 psi.

The improved pellets provided by the present invention, on a calcined basis, have a weight ratio of $Al_2O_3$ to $SiO_2$ in the approximate range of 2.2 to 4.0. The weight percentage of $Fe_2O_3$ in the proppant is controlled to a value of 6% or less so as to avoid adverse effects on the strength of the proppant. The apparent density, in g/ml, is controlled to a value between approximately 2.8 and 3.3. The unpacked bulk density of the proppant is between approximately 90 and 120 lbs/cf.

The invention, and its objects and advantages, will become more apparent in the following description of preferred embodiments.

BRIEF DESCRIPTION OF THE DRAWINGS

In the following description of preferred embodiments of the present invention, reference will be made to the accompanying drawings, in which.

DESCRIPTION OF THE PREFERRED EMBODIMENTS

Figure 1:
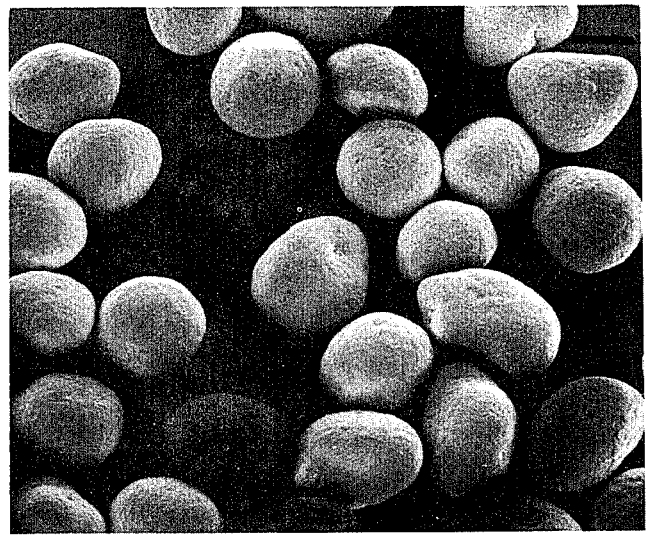
FIGS. 1(a), 2(a) and 3(a) are low magnification (20×) SEM photomicrographs of prototype proppant products provided by the present invention.
FIGS. 1(b), 2(b), and 3(b) are intermediate (100×) magnification SEM photomicrographs of the proppant products of FIGS. 1(a), 2(a), and 3(a) respectively.
Figure 1:
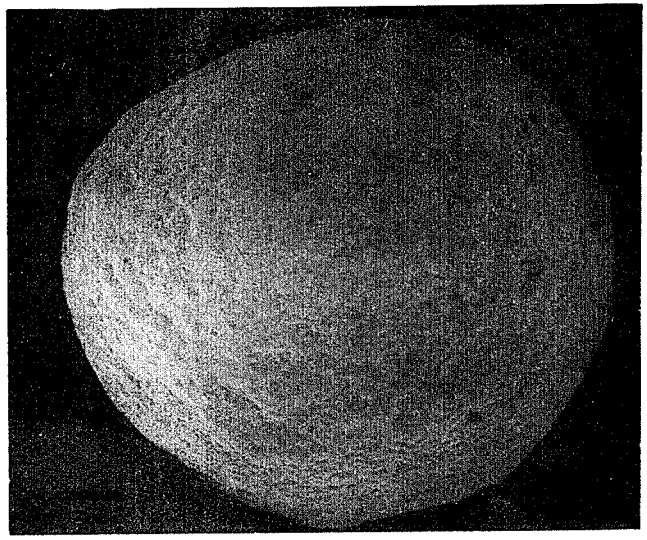
Figure 2:
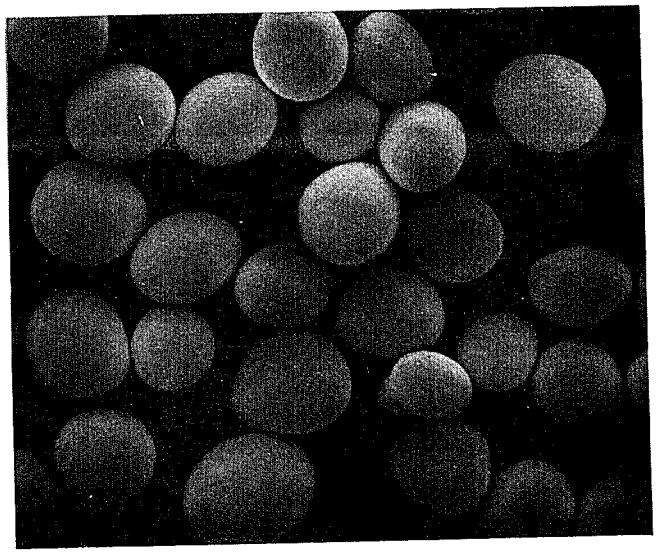
Figure 2:
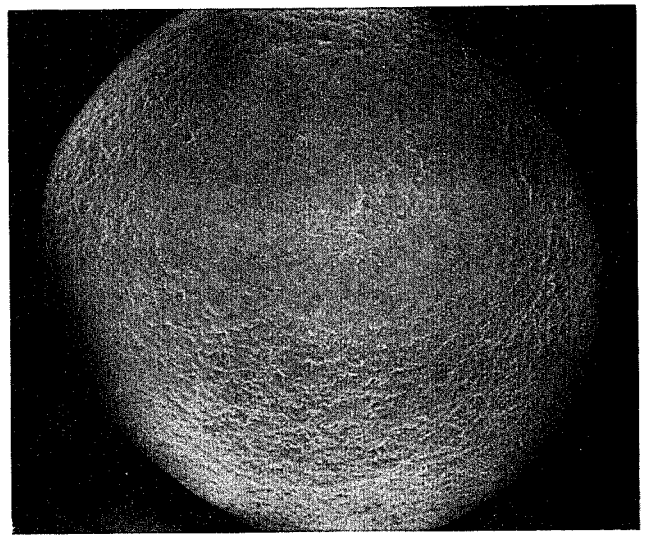
Figure 3:
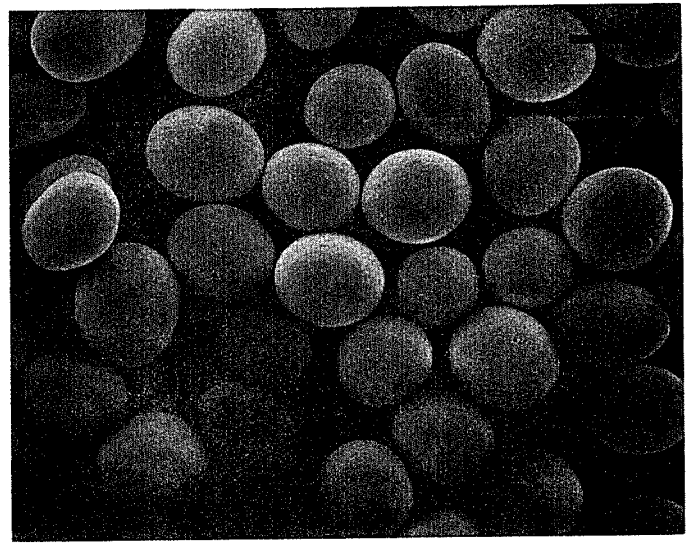
Figure 3:
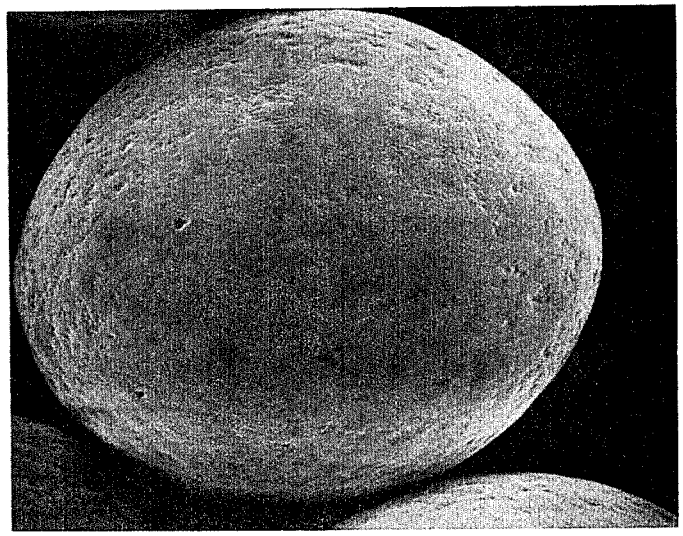

The present description will be directed in particular to elements forming part of the present invention. Elements not specifically described are understood to be selectable from those known in the art.

Considering now the present invention, it provides a process for producing an improved aluminosilicate ceramic proppant from as-mined ore. One example of a suitable ore, on a dry weight basis, contains approximately 47.8 to 50.9% alumina ($Al_2O_3$), 12.6 to 21.2% silica ($SiO_2$), and 5.9 to 8.6% of iron-containing particles ($Fe_2O_3$). On a calcined basis, the alumina range is between about 60.0 and about 70.0%, the silica range is between about 16.0 and 30.0%, and the $Fe_2O_3$ range is between about 5.0 and 15.0%. The weight ratio of alumina to silica is controlled to a level between about 1.9 and 4.0.

In a preferred variation of the preceding, the alumina range on a calcined basis is between about 61.3 and 66.7%, the silica range is between about 16.8 and 27.2%, and the $Fe_2O_3$ is preferably less than about 11.5%.

With one of the production methods provided by the present invention, as-mined ore is subjected to a primary crushing operation to obtain particles no larger than approximately 3" in diameter. If necessary, the ore is dried so that it contains a free moisture content no greater than approximately fifteen percent (15%). A secondary crushing operation then reduces the size of the particles to a diameter of approximately 0.25". After secondary crushing, the particles are subjected to a wet grinding process. Next, the particles are subjected to magnetic beneficiation to remove particles containing excessive levels of $Fe_2O_3$. The amount of particles removed is a function of the ratio of alumina to silica within the blended particles. As the ratio increases, there can be a corresponding increase in the amount of iron that can be tolerated. It has been found that excess levels of iron have an adverse affect on the crush strength of the pellets formed from the ore, i.e., at alumina to silica ratios between about 1.9 and about 3.9, $Fe_2O_3$ levels generally should be below about 6% and preferably below 5%.

After beneficiation, the particles are subjected to a partial dewatering to obtain a moisture content no greater than approximately five percent (5%). After deagglomeration, the particles are fed to a forming operation that adds water and processes the particles so as to form substantially spherical particles, such as 18×35 mesh spheres. After drying of these spheres to a moisture level less than approximately eight percent (8%), the spheres are subjected to a screening operation, with undersized spheres being returned to the sphere forming process and oversized spheres being returned to the deagglomeration process. Spheres of desired size are subjected to elevated temperatures to accomplish sintering and calcination. During this process, the volume of the pellets is shrunk. For instance, a pellet having a diameter of approximately 1.0" prior to calcination will have a diameter of approximately 0.75" after calcination. The calcined pellets are subjected to a final screening, for instance, screening through a 20×40 mesh, to obtain product proppant of a desired size. Under and over-size pellets can be used as abrasives, facing on pipes, and for other uses requiring high-strength particles or pellets.

As a non-limiting example of pellet formation, particles are mixed in a Simpson mix muller, agglomerated in a Stokes granulator, and rounded and densified in a Marumerizer apparatus.

Several features of the present invention should be readily apparent from the preceding description. For instance, since the process starts with as-mined ore, it is easier to crush and grind the ore to obtain particles having desired sizes for pellet formation, such as particles with a mean diameter below 5 micrometers and as low as 1 micrometer or less. Less than 5 weight percent of the particles preferably has a diameter greater than 44 micrometers (325 mesh). More preferably, none of the particles exceed 44 micrometers in diameter. Since the ore is not calcined before formation of the particles, it is significantly easier to obtain particles of the desired size for pellet formation. Use of small particles in the pellet forming operation facilitates formation of spheres having substantially smooth exterior surfaces. Calcined bauxite often has a hardness between 8 and 9 on the Moh scale, while ore of the type processed in the present invention typically has a hardness between 3 and 4 on the Moh scale. This hardness compares with a hardness of 2.5 for Gibbsite and a hardness of 1.5 for kaolin.

Another feature that contributes to the desirable configuration of the proppants provided by the present invention is the amount of shrinkage that occurs during calcination of the pellets formed from green ore. It is easier to form a large pellet and shrink it to obtain a pellet having a desired configuration than it is to initially form a small pellet. Conventionally, when pellets formed from previously calcined materials are subject to a sintering operation, there is an approximately thirty percent (30%) volume shrinkage, a value significantly less than the volume shrinkage obtained with the present invention, e.g., at least about 50% and approaching 60% or greater.

Another advantage of using as-mined ore in the process provided by the present invention is that the particles formed from the crushing and grinding operation are relatively plastic. There is no need to add a plasticizer, such as bentonite or a bentolite kaolin clay, during the formation of spheres from the particles.

As can be seen from FIGS. 1(a), 1(b), 2(a), 2(b), 3(a) and 3(b), proppants produced by the present invention have substantially smooth exterior surfaces and have relatively uniform spherical sizes. Both of these characteristics are extremely desirable in proppants in that they increase the utility of the proppants when they are used in a propping operation. Smooth exterior surfaces reduce the surface areas susceptible to attack by acids in the substrates containing the fluids being pumped, while generally spherical shapes facilitate formation of flow passages through the packed proppants.

Figure 4:
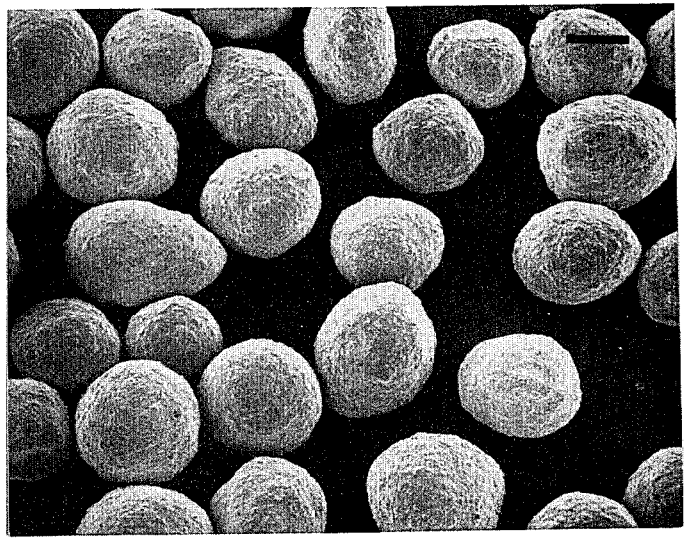
FIG. 4(a) is a low (20×) magnification SEM photomicrograph of a commercially available proppant.
FIG. 4(b) is an intermediate (100×) magnification SEM photomicrograph of the proppant of FIG. 4(a).
Figure 4:
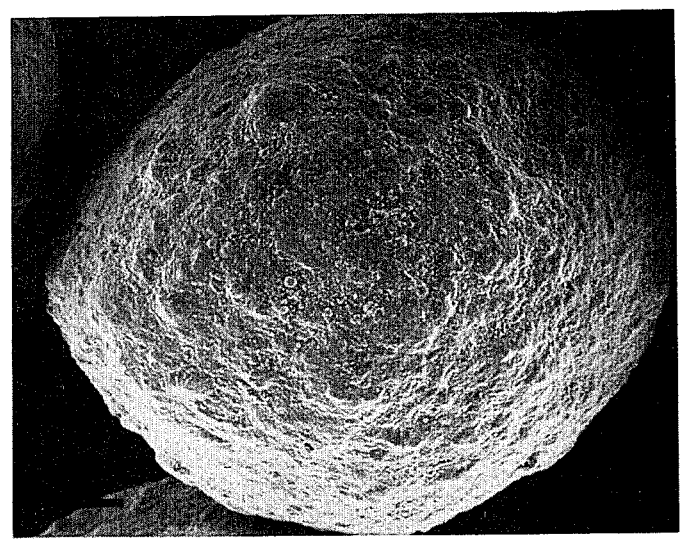

Considering again the drawings, FIGS. 1(a) and 1(b) depict one embodiment of a proppant according to the present invention (Sample A) that has a relatively low weight ratio of alumina to silica of 2.149. This sample was produced in a pilot plant using a method similar to that described in U.K. Patent Application No. 2,037,727. FIGS. 2(a), 2(b), 3(a) and 3(b) depict proppants made in a pilot plant using a different processing technique. The proppant depicted in FIGS. 2(a) and 2(b) (Sample B) has a weight ratio of alumina to silica of 2.576. The proppant depicted in FIGS. 3(a) and 3(b) (Sample C) has a weight ratio of alumina to silica of 3.392. FIG. 4(a) and FIG. 4(b) depict a commercial proppant (Sample D) having a weight ratio of alumina to silica of 21.962. The following table provides additional data for the proppants depicted in the drawings.

TABLE

| Sample Number | Product Proppants 20 × 40 Mesh | | Apparent Density (gm/ml) | Packed Density (lb/ft$^3$) | Feed Analysis Calcined Basis (%) | | | | Wt. Ratio Al$_2$O$_3$:SiO$_2$ |
|---|---|---|---|---|---|---|---|---|---|
| | Crush Loss (%) @ PSI of | | | | Fe$_2$O$_3$ | SiO$_2$ | Al$_2$O$_3$ | TiO$_2$ | |
| | 10K | 7.5K | | | | | | | |
| A | 5.3 | 1.6 | 3.00 | 112 | 4.23 | 28.97 | 62.26 | 2.31 | 2.149 |
| B | 4.6 | 1.0 | 3.07 | 115 | 6.78 | 24.43 | 62.92 | 3.05 | 2.576 |
| C | 1.4 | 0.2 | 3.22 | 125 | 5.33 | 19.99 | 67.79 | 3.30 | 3.392 |
| D | 4.9 | 1.8 | 3.69 | 140 | 6.46 | 3.93 | 86.31 | 3.24 | 21.962 |

In a second embodiment of the proppant production method provided by the present invention, as-mined ore is subjected to primary and secondary crushing and then is dried to a moisture level less than approximately 2.0%. The particles are then subjected to partial grinding followed by magnetic beneficiation. After beneficiation, the particles are either subjected to additional wet grinding, dewatering, and deagglomeration, or are subjected to dry grinding. After either deagglomeration or dry grinding, the particles are formed into spheres in substantially the same manner as with the first described production method.

In a third embodiment of the production method provided by the present invention, as-mined ore is subjected to primary and secondary crushing and drying to a moisture level of approximately 2.0% or less. After partial grinding, the material is subjected to screening to remove particles containing high iron content. This production method is based on the concept that particles containing iron will be harder and more resistant to grinding than non-iron containing particles. Thus, the screening operation should facilitate separation of larger iron-containing particles from smaller other particles. The other particles then would be treated as with the second embodiment, that is, subjected to either dry or wet grinding followed by pellet formation.

In a fourth embodiment of the proppant production method, which is theoretically preferred, as-mined ore is blended to obtain an alumina to silica weight ratio of between about 1.9 and 3.9. If necessary, the free moisture content of the blended ore is reduced to a level of approximately fifteen percent (15%) or less. The ore is then subjected to primary crushing to obtain particles no larger than approximately 3.0". A secondary crushing obtains particles approximately 0.25" in diameter. After secondary crushing, the particles are subjected to a combined operation involving drying, grinding, and beneficiation in one mill. The function of the drying and grinding is to reduce the particle moisture and diameter to low enough values, such as a particle size of 5 micrometers, to allow air classification of the particles. Theoretically, iron-containing particles, which are more dense than non-iron containing particles, can be separated from the remaining particles by such air classification. One of the reasons this is the theoretically preferred method is that removal of the iron-containing particles during grinding eliminates the need to provide magnetic separators. After the more dense iron containing particles are removed, the remaining particles are subjected to pellet forming as with the previously described production methods.

Previously, specific embodiments of the present invention have been described. It should be appreciated however, that these embodiments have been described only for the purpose of providing an understanding of the present invention. The invention is limited only by the appended claims.

What is claimed is:

1. In a process for producing an aluminosilicate ceramic proppant for use in fracturing of wells comprising performing crushing operations on bauxite clay to obtain particles of a desired size, agglomerating the particles to form pellets, and subjecting the pellets to a combined sintering and calcining process to thereby produce an aluminosilicate ceramic proppant, the improvement wherein the particles to be agglomerated to form the pellets are non-calcined particles, and wherein the process further comprises subjecting the paritcles after crushing and prior to agglomeration to a combined operation involving drying, grinding and air classification so as to remove more dense iron-containing particles from the particles to be agglomerated to form the pellets without the need for magnetic separation.

2. A process according to claim 1, wherein the pellets are formed as 18×35 mesh spheres.

* * * * *